United States Patent [19]

Morris

[11] 4,091,431
[45] May 23, 1978

[54] GROUND LEAKAGE RELAY CIRCUIT

[75] Inventor: Alton R. Morris, Trumbull, Conn.

[73] Assignee: Harbey Hubbell, Incorporated, Bridgeport, Conn.

[21] Appl. No.: 79,649

[22] Filed: Oct. 9, 1970

Related U.S. Application Data

[63] Continuation of Ser. No. 615,774, Feb. 13, 1967, abandoned, which is a continuation of Ser. No. 856,523, Aug. 22, 1969, abandoned.

[51] Int. Cl.² .............................................. H02H 3/16
[52] U.S. Cl. .................................................... 361/45
[58] Field of Search .............. 317/18 D, 27 R, 33 SC, 317/36 TD; 361/44-46

[56] References Cited

U.S. PATENT DOCUMENTS

| | | | |
|---|---|---|---|
| 3,213,321 | 10/1965 | Dalziel | 317/18 D |
| 3,286,129 | 11/1966 | Gagniere | 317/27 R |

*Primary Examiner*—Harry E. Moose, Jr.
*Attorney, Agent, or Firm*—Wooster, Davis & Cifelli

[57] ABSTRACT

A ground leakage relay circuit including a core balance transformer through which pass the supply and return line of the circuit to be protected and having a multi-turn secondary winding. A capacitor is connected to be normally charged from a d.c. source. A normally conducting transistor is connected across the capacitor. When the transformer secondary winding exceeds a preselected level, the transistor is switched "off" to permit a voltage build-up across the capacitor. When the voltage across the capacitor reaches a triggering value, it actuates a relay to open the supply line.

10 Claims, 3 Drawing Figures

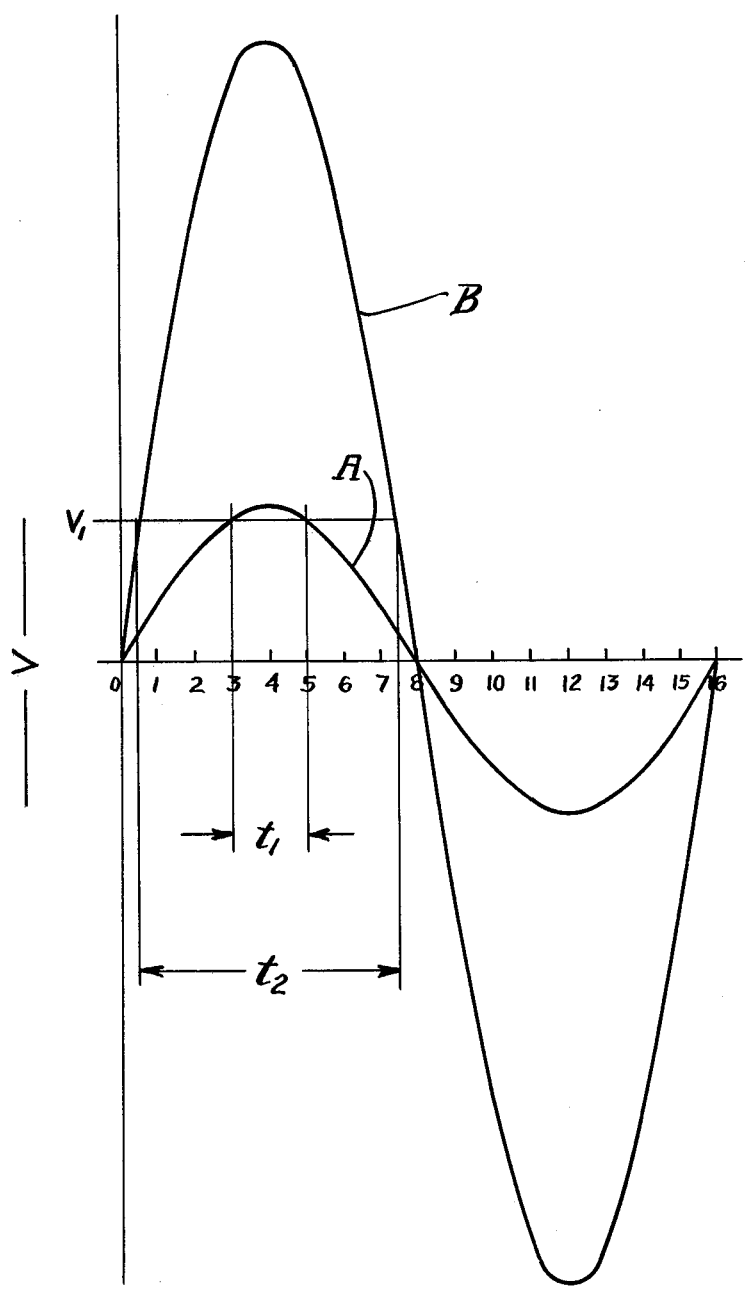

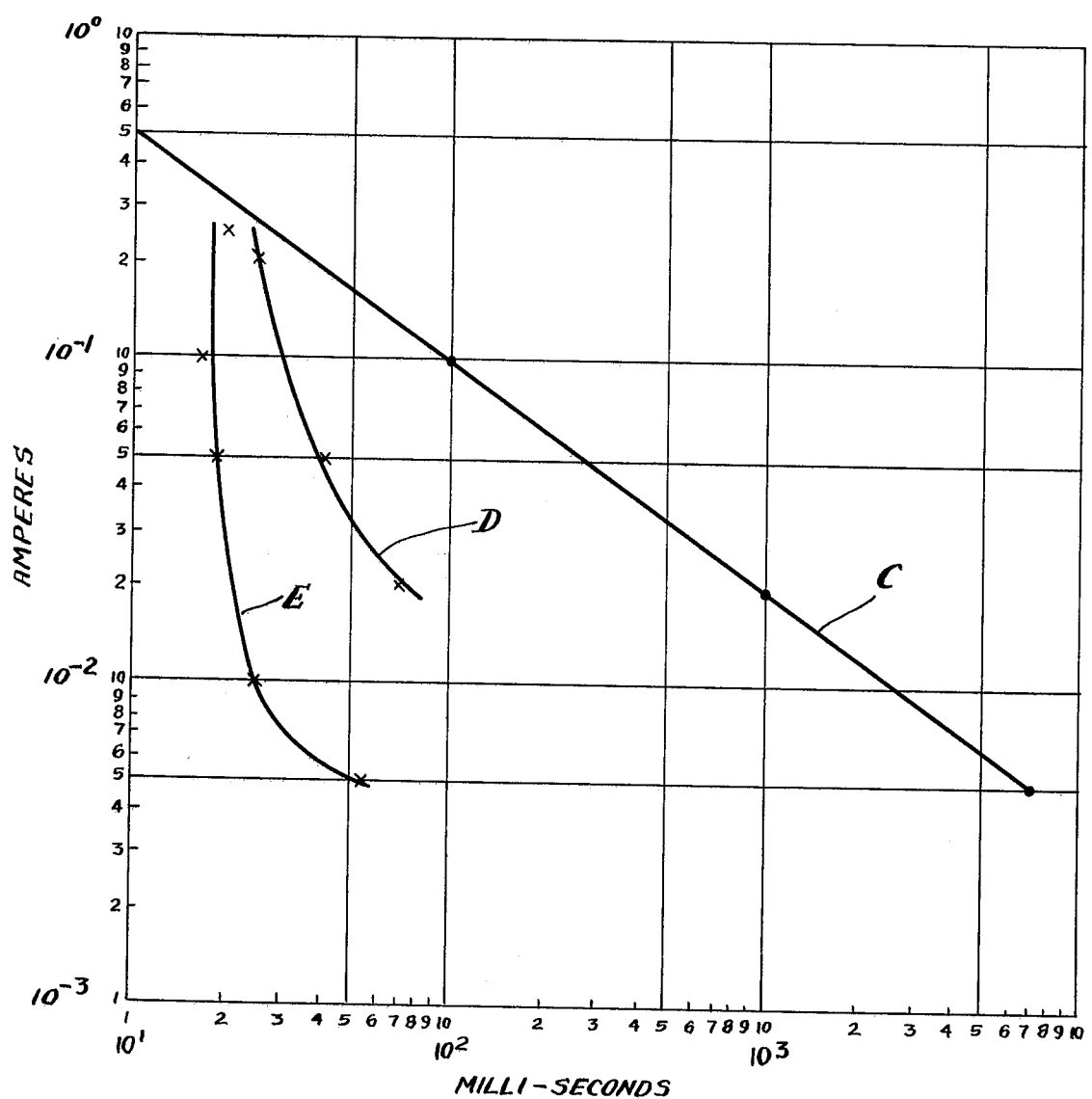

GROUND LEAKAGE RELAY CIRCUIT

This application is a continuation of my copending application Ser. No. 856,523 filed August 22, 1969, which in turn was a continuation of my then copending application Ser. No. 615,774 filed Feb. 13, 1967 for "Ground Leakage Relay Circuit," both now abandoned.

This invention relates to a ground leakage relay circuit and, more particularly, to such a circuit which utilizes a differential transformer and has a number of advantages over prior art circuits.

Several circuits have been proposed in the prior art for interrupting the power supplied to a load on the occurrence of a grounded condition at the load. These circuits customarily employ a differential or "core balance" transformer. Transformers of this type have a toroidal core through which the supply and return line pass, thus forming single turn primary windings. A multiple turn secondary winding is also provided on the core. Under normal conditions, the vector sum of the currents in the supply and return lines is equal to zero so that zero magnetic flux is produced in the transformer core and no voltage is induced in the secondary winding. However, in the event of a ground occurring at the load, or between the transformer and the load, a portion of the current in the supply line returns through the external ground rather than through the return line, causing an unbalanced condition which produces a magnetic flux in the core of the transformer. The resultant flux induces a voltage in the transformer secondary winding and this secondary voltage is employed to actuate a circuit breaker to disconnect the load. Prior art devices of this type have had certain deficiencies which it would be desirable to overcome. First, the circuits are often sensitive to short term transients and needlessly activate the circuit breakers. One cause of such transients is the normal capacitance between line and ground. When the line is energized, this may create such a short term transient current flow. Second, the speed at which the breaker acts is often independent of the differential current produced. This means that breaker speed is often too slow under severe grounding conditions and too fast on the occurrence of minor grounds. Third, the use of mechanical components, such as relays, in the intermediate circuitry presents the possibility of mechanical failures. Fourth, in many circuits, the circuit breaker is activated only during the existence of the grounding condition. Once tripping has occurred, it would be desirable for the circuit breaker to remain open until the circuit can be inspected and corrective action taken.

Accordingly, it is a primary object of this invention to provide an improved ground leakage relay circuit. Other objects are to provide such a circuit which is insensitive to short term transients; wherein the speed of breaker action is proportional to the differential current; wherein the relay circuit is composed entirely of solid state elements; and wherein the circuit breaker will remain in its open position after activation until deliberately reset.

The manner in which the foregoing objects are achieved will be more apparent from the following description, the appended claims, and the Figures of the attached drawing wherein:

FIG. 2 illustrates certain wave forms helpful in understanding the operation of the invention; and FIG. 3 illustrates the tripping characteristics of the circuit of the invention as compared to a prior art circuit and to the Underwriters Laboratories requirement.

Figure 1:
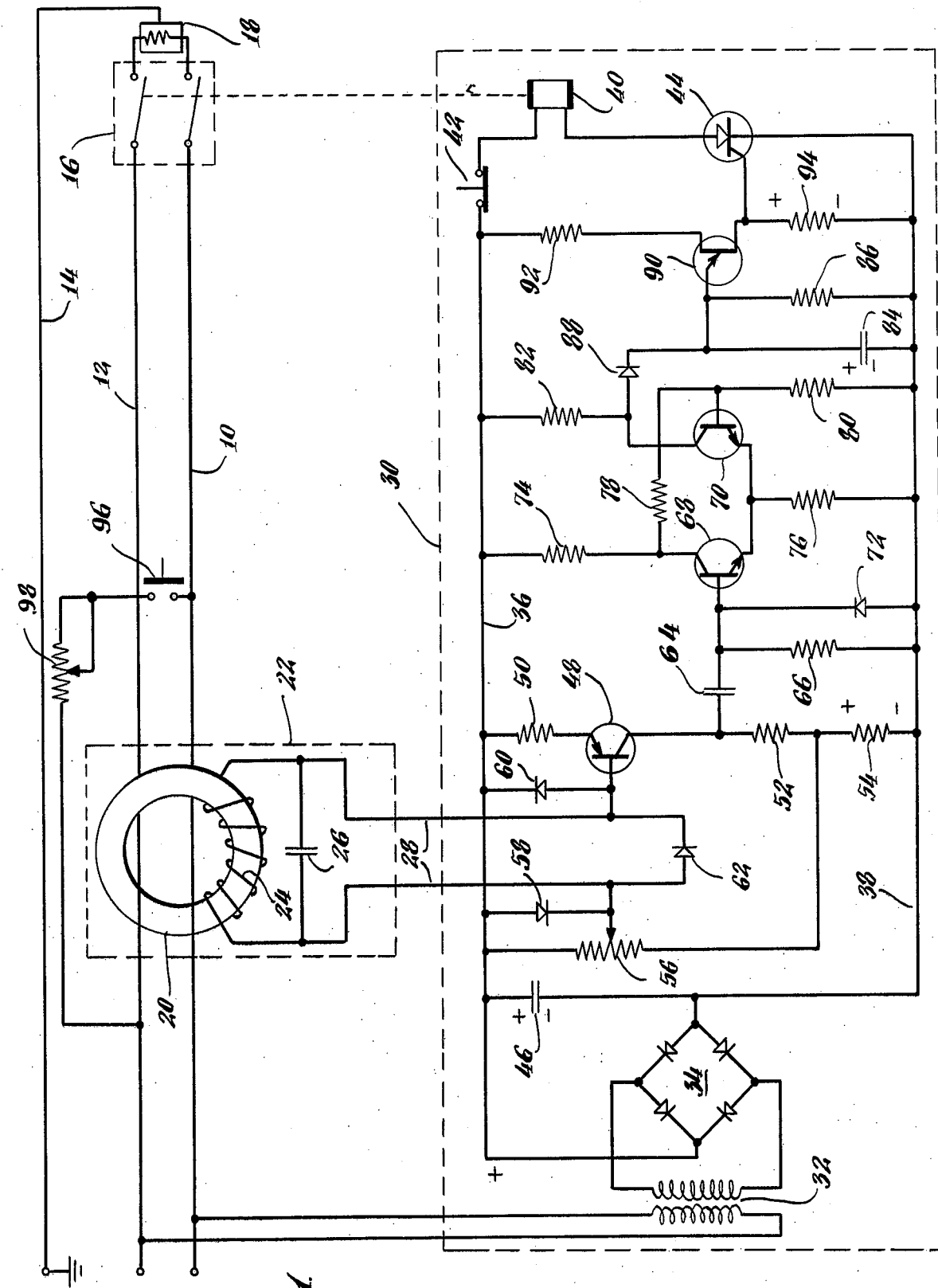
FIG. 1 illustrates a circuit in accordance with this invention.

The objects of this invention are achieved by means of a relay circuit which includes detection means responsive to the vector sum of the currents in the supply and return lines to produce an error signal proportional thereto. Capacitance means is also included in the circuit, along with d.c. supply means connected to charge the capacitance. Shunt means having a high impedance state and a low impedance state is provided in parallel with the capacitance. A control circuit responsive to the error signal changes the shunt means from its low impedance state to its high impedance state during the existence of an error signal of preselected amplitude. A circuit breaker is provided in the supply line and circuit breaker actuating means are provided responsive to the charge on the capacitance to open the circuit breaker on the occurrence of a voltage of preselected amplitude across the capacitance.

Referring to the drawing of FIG. 1, there is illustrated a power supply system including a supply line 10, a return line 12, and a separate grounding line 14. The supply and return lines are connected through a double pole circuit breaker 16 to supply an electrical load 18. The supply line 10 and the return line 12 pass through the toroidal core 20 of a differential core balance transformer 22. These lines form single turn primary windings.

There is also provided in the disclosed circuit, a test switch 96 which is in series with variable potentiometer 98 between the load end of supply line 10 and the supply end of return line 12. A multiple turn secondary winding 24 is provided on the same core. A smoothing capacitor 26 is connected across the secondary winding 24 and the winding leads 28 are connected to actuate a relay circuit 30 which will now be described.

The relay circuit 30 includes a d.c. power supply comprising a transformer 32 having its primary winding connected to the alternating current power supply and its secondary winding connected to a full-wave rectifier 34. The positive lead 36 and the negative lead 38 from power supply 34 are connected to a relay coil 40 through a reset switch button 42 and the anode-cathode terminals of a silicon controlled rectifier 44. A filter capacitor 46 is also connected across the d.c. output of rectifier 34. The collector-emitter circuit of a temperature-stabilized PNP transistor amplifier 48 is connected between positive lead 36 and negative lead 38 through resistors 50, 52, 54. A potentiometer 56 is connected between positive lead 36 and the intermediate connection between resistors 52, 54. One of secondary winding leads 28 is connected to the base of transistor amplifier 48 and the other is connected to the wiper of potentiometer 56. A diode 58 is connected between positive lead 36 and the wiper of potentiometer 56 and a diode 60 is connected between positive lead 36 and the base of transistor amplifier 48. These diodes are polarized in such a manner that they will short circuit alternate half cycles produced across the leads 28 of the secondary winding of the differential transformer 22. A third diode 62 has a high forward impedance and is inoperative during normal operation of the circuitry, its function being to short circuit the output of secondary winding 24 in the event of extreme fault currents flowing in supply line 10 or return line 12.

The output from the amplifier 48 is applied through a coupling capacitor 64 and a resistor 66 to the input of a Schmitt trigger circuit comprising NPN transistors 68, 70. A diode 72 across resistor 66 short circuits signals of improper polarity and prevents them from being applied to the base of transistor 68. The collector of transistor 68 is connected to positive lead 36 through resistor 74. The emitter is connected through resistor 76 to negative lead 38. The second stage transistor 70 of the Schmitt trigger circuit also has its emitter connected to resistor 76, its base being tied to the collector of transistor 68 through resistor 78 and also to the negative lead 38 through resistor 80. The output from the Schmitt trigger circuit is applied to a timing circuit comprising resistor 82, capacitor 84, and resistor 86. The timing circuit also includes a diode 88 for controlling the polarity of the charge applied to capacitor 84. A unijunction transistor 90 is connected so that its emitter receives the output of the timing circuit and its base two terminal is connected to the positive lead 36 through resistor 92. The base one terminal is connected to the gate of SCR 44 and to negative lead 38 through resistor 94.

OPERATION

Under normal operating conditions of equal current flow in supply line 10 and return line 12, transistor 68 of the Schmitt trigger circuit will be in its "off" condition but transistor 70 will be conductive. Transistor 70 and resistor 76 form a low resistance shunt across capacitor 84 and diode 88, thus preventing any appreciable voltage build-up across the capacitor. The usual charge across capacitor 84 under these conditions might be, for example, 0.2 volt. This potential is applied to the emitter of unijunction transistor 90 but, as it is so low, the unijunction transistor does not go into conduction. Thus, the gate of the silicon controlled rectififier 44 is not energized and the silicon controlled rectifier remains in its "open", or high impedance, state preventing relay coil 40 from being energized and allowing the circuit breaker 16 to remain closed.

Upon the occurrence of a fault which causes an unbalanced current condition in supply line 10 and return line 12, there is a net flux produced in transformer core 20 which induces a voltage across secondary winding 24 which is applied to the wiper of potentiometer 56 and to the base of transistor 48. During alternate half cycles of the supply frequency, the base-emitter voltage applied to transistor 48 causes this transistor to go into conduction. The response of transistor 48 is governed by the setting of potentiometer 56. For example, if it is desired to detect a minimum current differential of 5 ma. the potentiometer 56 is adjusted so that transistor 48 will just begin to go into conduction at such a value. On the alternate half cycles, as previously explained, the secondary leads 28 are short circuited. During each period of conduction of transistor 48 a potential is built up across resistor 66. When this potential reaches a sufficient value, transistor 68 conducts. It will be noted that the time during which transistor 68 conducts is also established by the setting of potentiometer 56.

During the period that transistor 68 conducts, transistor 70 goes out of conduction, in the usual manner of the Schmitt trigger circuit. This removes the short circuiting path from around capacitor 84 so that the capacitor begins to charge through resistor 82 and diode 88. The charging time constant established by resistor 82 is substantially greater than the discharge time constant established by resistor 86. Thus, the charge built up on the capacitor 84 during one-half cycle remains substantially undissipated during the succeeding half cycle. When the charge across the capacitor 84 builds to a sufficient level, the unijunction transistor 90 is triggered into its conducting state, whereupon the capacitance 84 discharges through resistor 94 and the resultant potential triggers the silicon controlled rectifier 44 into its low impedance state. This, in turn, energizes relay coil 40, opening the contacts of the circuit breaker 16.

The operation of the circuit of this invention may be best understood by reference to FIG. 2. In this Figure, curve A represents the potential across leads 28 when the differential current between lines 10 and 12 is at an assumed value of 5 ma. Potentiometer 56 is adjusted so that there will be supplied to resistor 66 a potential sufficient to trigger transistor 68 into conduction whenever the potential across leads 28 exceeds a threshold value $V_1$. Under the illustrated conditions, the potential exceeds such value for time $t_1$ (2ms.) and the capacitor 84 is charged for such period. If the condition persists, capacitor 84 will be incrementally charged on each positive half cycle until its potential is sufficient to actuate relay 16. If the condition disappears before the potential reaches such level, the capacitor 84 will discharge through resistor 86.

Curve B represents the potential across leads 28 at some greater value of current differential. Under the illustrated conditions, the potential exceeds the threshold value for time $t_2$ (7ms.) Accordingly, capacitor 84 will be charged for a longer time each cycle, its potential will build at a faster rate, and the circuit breaker 16 will open sooner.

It will be noted that the circuit of this invention is relatively insensitive to short term transients. This is because the capacitor 84 is charged only during alternate half cycles and in steps. Thus, any partial charge built up on the capacitor 84 during one-half cycle would be dissipated through resistor 86 during succeeding cycles. Secondly, the speed at which the circuit breaker 16 is operated is dependent upon the amount of differential current being detected. A large current of sufficient time duration will cause the voltage across capacitor 84 to build rapidly, while a small differential will cause the voltage to build incrementally during successive cycles until a tripping value is reached. Third, it is a characteristic of a silicon controlled rectifier that, once it begins to conduct, it continues in conduction as long as a minimum sustaining current is passed. Thus the relay is held in its open position. In order to reset the circuit, it is necessary to open switch 42 which allows the silicon controlled rectifier 44 to return to its high impedance condition and the circuit to once more become operative.

It is believed that the operation of the test circuit will be readily understood. Upon depression of switch 96, a leakage path is created around the core 20, resulting in an unbalanced current condition in supply line 10 and return line 12, causing the circuit to trip.

The improved results obtained by the circuit of this invention will be apparent from an inspection of FIG. 3. In this Figure, curve C represents tentative tripping time requirements established by Underwriters Laboratories. Curves D and E illustrate actual results of tests performed, respectively, with a prior art circuit and the circuit of this invention. The improved performance of the invention will be obvious.

EXAMPLE

It will be understood by those skilled in the art that the values of the various circuit elements may be selected to meet the particular circumstances. However, in one embodiment of the invention, the following values were employed:

| | |
|---|---|
| Secondary winding 24 | 1300 turns |
| Capacitor 26 | .15 μfd |
| Transformer 32 | 5:1 |
| Capacitor 46 | 50 μfd |
| Resistor 50 | 330 ohms |
| Amplifier 48 | 2N3638 |
| Resistor 52 | 15000 ohms |
| Resistor 54 | 2200 ohms |
| Capacitor 64 | 5 μfd |
| Resistor 66 | 10000 ohms |
| Resistors 74, 78 | 8200 ohms |
| Transistors 68, 70 | 2N3859A |
| Resistor 76 | 150 ohms |
| Resistor 80 | 2700 ohms |
| Resistor 82 | 8200 ohms |
| Capacitor 84 | .68 μfd |
| Resistor 86 | 470,000 ohms |
| Unijunction 90 | 2N2646 |
| Resistor 92 | 330 ohms |
| Resistor 94 | 47 ohms |
| SCR 44 | G.E. C106B2 |
| Potentiometer 98 | 24,000 ohms |

It is believed that the many advantages of this invention will now be apparent to those skilled in the art. It should be understood that this invention is applicable to the protection of multi-phase, as well as single phase, circuits. For example, for a three phase, three wire system, all three phase lines would pass through the transformer core. Accordingly, the term "return", as used in the appended claims, is to be broadly construed to include other phase lines. It is also believed that many other variations and modifications may be made in this invention without departing from its spirit and scope. Accordingly, the foregoing description is to be construed as illustrative only, rather than limiting.

I claim:

1. A ground leakage relay circuit for use in an alternating current system including at least one supply line and a return which comprises: detection means responsive to the vector sum of the currents in said supply line and return to produce an error signal proportional thereto; capacitance means; diode means in series with said capacitance means; d.c. supply means connected to charge said capacitance means; shunt means in parallel with said capacitance means and diode means and having a high impedance state and a low impedance state; control circuit means responsive to said error signal to change said shunt means from its low impedance state to its high impedance state during the existence of an error signal of preselected amplitude; circuit breaker means in at least said supply line; and circuit breaker actuating means responsive to the charge on said capacitance means to open said circuit breaker means on the occurrence of a voltage of preselected amplitude across said capacitance means.

2. The circuit of claim 1 wherein said detection means comprises a differential transformer.

3. The circuit of claim 1 wherein said shunt means comprises first solid state switching means.

4. The circuit of claim 3 wherein said first solid state switching means is a transistor.

5. The circuit of claim 3 wherein said first solid state switching means forms the second stage of a Schmitt trigger circuit and wherein said control circuit means comprises second solid state switching means forming the first stage of said Schmitt trigger circuit.

6. The circuit of claim 5 wherein said control circuit means additionally comprises third solid state switching means having its output connected to said second solid state switching means and its input connected to said detection means.

7. The circuit of claim 1 wherein a discharge impedance means is connected across said capacitance means.

8. The circuit of claim 7 wherein the charging time constant of said capacitance means is less than its discharge time constant.

9. The circuit of claim 1 wherein said circuit breaker actuating means comprises: a relay coil; solid state switching means in series with said relay coil and having a normally high impedance state but actuatable to a low impedance state; and means responsive to the charge on said capacitance means to actuate said solid state switching means to its low impedance state.

10. The circuit of claim 9 wherein said solid state switching means is a controlled rectifier.

* * * * *